Figure 1:
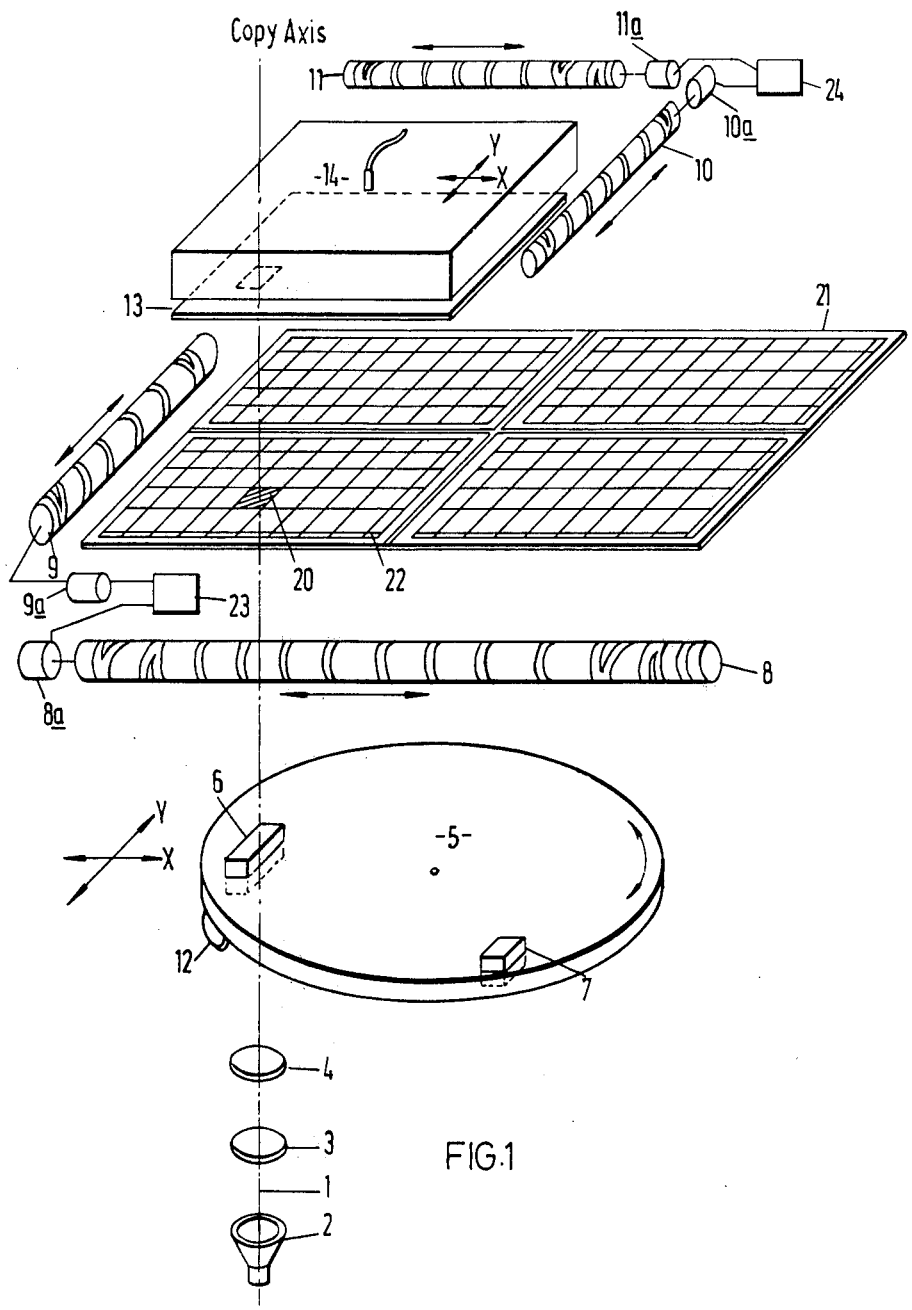

United States Patent [19]

Spence-Bate

[11] 4,047,813
[45] Sept. 13, 1977

[54] AUTO EDITORS

[76] Inventor: Harry Arthur Hele Spence-Bate, 115 Cheam Place, Morley, Australia, 6062

[21] Appl. No.: 599,586

[22] Filed: July 28, 1975

[30] Foreign Application Priority Data

July 29, 1974 Australia .............................. 8365/74
Nov. 21, 1974 Australia .............................. 9705/74

[51] Int. Cl.$^2$ ............................................ G03B 27/04
[52] U.S. Cl. ........................................ 355/95; 355/54; 355/91
[58] Field of Search .................... 355/95, 91, 93, 94, 355/132, 1, 53, 54, 40; 354/4; 353/27, 27 A

[56] References Cited

U.S. PATENT DOCUMENTS

| 2,974,579 | 3/1961 | Echelson et al. | 355/95 |
| 3,604,801 | 9/1971 | Young | 355/91 |
| 3,685,902 | 8/1972 | Blackert | 355/95 |
| 3,873,202 | 3/1975 | Inoue | 355/95 |
| 3,907,426 | 9/1975 | Goodliffe | 355/54 |

*Primary Examiner*—Stephen J. Tomsky
*Attorney, Agent, or Firm*—Fidelman, Wolffe & Waldron

[57] ABSTRACT

A microfiche or microfilm editing device in which a microfilm or microfiche to be edited is supported on a frame arranged to be driven in an $x$ and $y$ axis directions according to a program, the movements being relative to a copy axis. Also movable in relation to the copy axis is a microfiche holding means arranged to be driven by actuators in a similar fashion to the first microfiche or microfilm and according to a further program. In order to illuminate the image to be transferred to the first film to the second film a light source condenser and at least one light transfer block is arranged to project light along the copy axis. Several light transfer blocks may be mounted on a rotatable turret so that different blocks may be provided for different microfiche or microfilm standards.

The editing device is arranged so that microfiches can be updated according to a set program or alternatively microfilm can be changed to microfiche or microfiches and one standard can be changed to microfiches of another standard.

5 Claims, 4 Drawing Figures

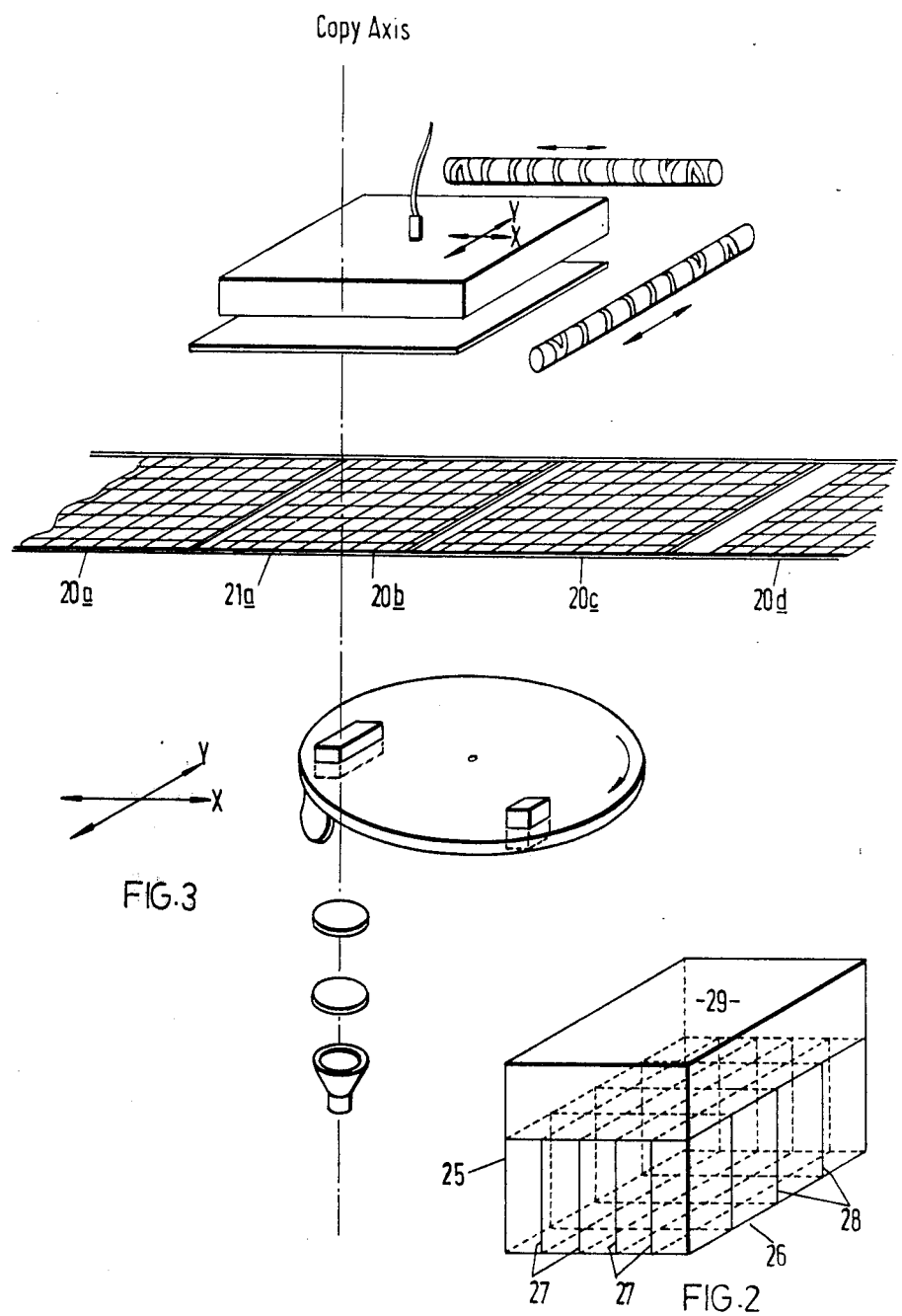

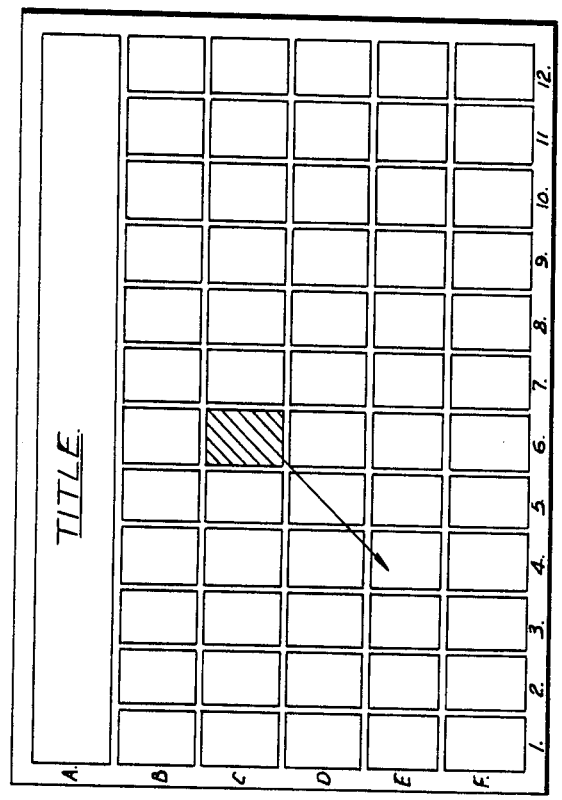

AUTO EDITORS

The present invention relates to an editing device for microfiche or microfilm cameras.

In my U.S. Patent application Ser. No. 497,463 there is described an editing device in which a microfiche or microfilm image may be transferred by an optical arrangement onto a new or updated microfiche. The arrangement consists essentially in adjusting the microfiche or microfilm manually relative to the microfiche which is being updated. Such an arrangement is very suitable for a certain range of cameras where speed is not essential and where economics dictate a relatively simple mechanism. However in the field of high speed work where large numbers of microfiche or microfilm images need to be transferred onto microfiche the arrangement cannot be made to work at any speed.

According to the present invention there is therefore provided a microfiche or microfilm editing device comprising a light source, a means of focussing light from the source along a copy axis through a first microfiche or microfilm held in a frame, an x actuator connected to the frame arranged to move the frame in an x direction and a first y actuator connected to the frame arranged to move the frame in a y direction, means for driving the first actuators according to a set program, holding means for a second microfiche, the holding means arranged to hold the second microfilm in close relationship to the first microfiche or microfilm, a second x actuator and second y actuator connected to the holding means and arranged to move the holding means in x and y directions respectively, means for driving the second actuators according to a further program.

The advantage of such an editing device is that the second microfiche onto which updating images are being recorded can be programmed to be moved according to one standard e.g. a predetermined number of frames in the x direction and a predetermined number of frames in the y direction. Whilst the first microfiche or microfilm can be moved according to a different standard or according to where images are located in set positions on the first microfiche or microfilm. In this way a set of microfiches of one standard can be reproduced in a different standard, or microfilm can be rapidly converted to microfiche, or alternatively certain information on the first set of microfiches or microfilm can be selected and transferred to a second set of microfiches. This latter facility is especially useful for effectively providing a read out record of specific information in say hospital use where all records of say x rays of bone fractures can be collected in one set of microfiches from a primary set of microfiches or microfilm which record various medical particulars with or without x ray images relating to a multiplicity of patients having differing ailments. The latter facility also provides a great advantage in various indexing and cataloguing systems for example when collecting records of spare parts for differing ranges of equipment.

In one preferred example of this invention the holding means comprises a suction platen. The means of focussing the light from the light source preferably includes a condensor and at least one translucent light transfer block, the block being adapted to transfer light from the condensor to the first microfiche or microfilm at substantially right angles to the plane of the first microfiche or microfilm and in a formed pattern for example in the pattern of a frame size of a particular standard. In this way the light transfer block acts only to assist in aligning the light rays but also to providing a mask for the image of the particular standard. Several such light transfer blocks each constructed for a specific standard may be mounted on a turret arranged to rotate about an axis parallel to the copy axis.

In the preferred embodiment of the invention arrangements may be provided to press the first and second films together onto the light transfer block. This enables accurate contact printing to be carried out.

The invention will now be described with reference to the accompanying drawings in which:

FIG. 1 is a diagrammatic drawing of one editing device according to this invention, FIG. 2 is a perspective drawing of a light transfer block used in the embodiment shown in FIG. 1, FIG. 3 is a diagram of a second editing device according to the invention, and FIG. 4 shows a microfiche with five rows and twelve columns according to one microfiche standard.

An automatic editing device is shown in FIG. 1 in which a light beam 1 is projected from a light source 2 up a copy axis through condensor lenses 3 and 4 and a light transfer block 6 mounted on a rotatable turret 5. The light beam is then projected up the copy axis through an image 20 on a first microfiche 22 carried in a frame 21. The image 20 is then projected onto a second microfiche 13 carried on a holding means which is in this case a suction platen 14.

The frame 21 is in this case capable of holding four microfiches but in the embodiment shown in FIG. 3 the frame 21a is arranged to hold a roll film incorporating a number of microfiches 20a to 20d in a row. Alternatively the frame 21 would be made to hold a microfilm. The frame 21 or 21a is arranged to be moved by an y axis actuator 9 for y direction movement and an x axis actuator 8 for x direction movement. The precise linkage between the frame and actuator and the details of step by step actuation by the actuator are the subject of further patent applications by myself. Each first actuator 8 and 9 are driven by motors 8a and 9a respectively and are controlled by first programming means 23. In the case of a frame carrying only microfilm it may be necessary only to provide an x or a y actuator only.

The suction platen 14 is similarly mounted for x and y directional movement and is controlled by a y actuator 10 and an x actuator 11 similarly controlled by motors 10a and 11a and a second programming means 24.

Means which are not shown for clarity are provided for pressing the suction platen 14 onto the turret 5 which is supported by a roller 12. In this way the microfiche 13 is pressed onto microfiche 22 which is in turn pressed onto light block 6.

The turret 5 is shown with two light blocks 6 and 7 but can accomodate more than two light boxes each of which is provided for a different image size.

One such light transfer block is shown in FIG. 2 from which it may be seen to consist in a translucent block 25 in the lower part 26 nearest the light source, there being provided light shields 27 and 28 which interlock to form a honeycomb arrangement. The construction of this block ensures that light rays strike the photographic film at substantially right angles which improves the performance of certain photographic copying materials. At the same time the block acts as a mask since the light is only transferred from the top of the block.

In order to show the layout of images on a microfiche an example is shown in FIG. 4 of a microfiche arranged to a certain standard. In this case it is required to produce a new microfiche with the same standard moving image C6 to E4. In order to do this the microfiche is inserted into the first frame 21 and the actuators align the frame so that the copy axis 1 is aligned with the C6 position. A second unexposed microfiche is picked up by the suction platen 14 from a suitably arranged cassette within the editing device and located by actuators 10 and 11 in the E4 position. The two microfiches are pressed together onto light transfer block 6 and light projected there through to expose the image area onto the second microfiche corresponding to location E4. Further exposures can be made to transfer other images into different locations and the fully exposed second microfiche is then developed.

What I claim is:

1. A microfiche or microfilm editing device comprising a light source, a means of focussing light from the source along a copy axis through a first microfiche or microfilm held in a frame, a first x actuator connected to the frame arranged to move the frame in an x direction and a first y actuator connected to the frame arranged to move the frame in a y direction, means for driving the first actuators according to a set program, holding means for a second microfiche, said holding means arranged to hold the second microfiche in close relationship to the first microfiche or microfilm, a second x actuator and second y actuator connected to the holding means and arranged to move the holding means in x and y directions respectively, means for driving the second actuators according to another set program.

2. A device as claimed in claim 1 wherein the holding means comprises a suction platen.

3. A device as claimed in claim 1 wherein the means for focussing light includes at least one light transfer block comprising a translucent block of material in which are embedded light shields arranged in a honeycombed pattern, the block being mounted and adapted to transfer light at substantially right angles to the first microfiche or microfilm.

4. A device as claimed in claim 3 wherein several light transfer blocks are located on a turrent arranged to rotate about an axis parallel to the copy axis.

5. A device as claimed in claim 4 wherein each of said light transfer blocks comforms to a standard frame size, whereby said blocks act as a mask for the image of said standard frame.

* * * * *